United States Patent
Kern et al.

Patent Number: 5,816,102
Date of Patent: Oct. 6, 1998

[54] ENGINE-GENERATOR SET WITH INTEGRAL GEAR REDUCTION

[75] Inventors: Robert D. Kern, Waukesha; Gerald C. Ruehlow, Oconomowoc, both of Wis.

[73] Assignee: Generac Corporation, Waukesha, Wis.

[21] Appl. No.: 758,359

[22] Filed: Dec. 3, 1996

[51] Int. Cl.[6] ........................................ F16H 1/02
[52] U.S. Cl. .................. 74/412 R; 74/413; 464/76; 290/1 A
[58] Field of Search .............................. 74/412 R, 413; 464/74, 76; 290/1 R, 1 A; 123/2, 3

[56] References Cited

U.S. PATENT DOCUMENTS

| | | |
|---|---|---|
| 1,362,770 | 12/1920 | Bijur . |
| 1,371,276 | 3/1921 | Tiedemann . |
| 1,449,800 | 3/1923 | Woolson . |
| 1,868,130 | 7/1932 | Bauer et al. . |
| 2,250,809 | 7/1941 | Martin et al. ........................... 123/195 |
| 2,251,722 | 8/1941 | Thomas ...................................... 64/13 |
| 2,910,882 | 11/1959 | Wellauer ................................. 74/412 |
| 3,025,408 | 3/1962 | Wolf ............................................ 290/1 |
| 3,837,179 | 9/1974 | Barth ......................................... 464/76 |
| 3,995,509 | 12/1976 | Backus et al. ............................. 74/413 |
| 4,435,990 | 3/1984 | Chalmers ................................... 74/413 |
| 4,548,164 | 10/1985 | Ylönen et al. ........................... 290/1 A |
| 4,677,940 | 7/1987 | Bracht et al. ................................ 123/2 |
| 4,698,975 | 10/1987 | Tsukamoto et al. .................... 290/1 A |
| 5,074,254 | 12/1991 | Takamatsu .............................. 290/1 A |
| 5,546,901 | 8/1996 | Acker et al. ......................... 123/195 C |

FOREIGN PATENT DOCUMENTS

| | | |
|---|---|---|
| 442589 | 4/1927 | Germany . |
| 61-102198A | 5/1986 | Japan . |

*Primary Examiner*—Rodney H. Bonck
*Assistant Examiner*—David M. Fenstermacher
*Attorney, Agent, or Firm*—Jansson, Shupe, Bridge & Munger, Ltd.

[57] ABSTRACT

In an engine-generator set, the generator has a first shaft driving a generator armature and also has a second shaft in spaced relationship to the first shaft. The second shaft is coupled to the engine and there is a gear on each of the shafts which provides a "step-down" gear reduction for powering the generator at, e.g., 1800 rpm, where the engine speed is greater than 1800 rpm. Preferably, the engine is coupled to the generator armature shaft through a torsional coupling for isolating engine vibration from the generator.

10 Claims, 2 Drawing Sheets

ENGINE-GENERATOR SET WITH INTEGRAL GEAR REDUCTION

FIELD OF THE INVENTION

This invention relates generally to prime mover dynamo plants and, more particularly, to such plants using internal combustion engines as prime movers.

BACKGROUND OF THE INVENTION

Engine-generator sets, sometimes referred to as "gen sets," are in wide use for a number of specific applications. Hospitals and other institutions require uninterrupted power for certain critical parts of their operation. They employ engine-generator sets to provide such power in the event of more-than-transitory failure of the commercial power supplied by the serving electric utility. If commercial power fails, the engine is started automatically and a transfer switch disconnects building wiring from the commercial power lines and reconnects such wiring to the engine-driven generator. Generac Corporation, Waukesha, Wis., is a leading manufacturer of engine-generator sets.

And engine-generator sets are used for many purposes other than providing standby emergency power. Contractors are frequent users of such sets to provide electrical power at a job site for operating power tools, illuminating lights and the like. Typically, the site is not yet connected to the commercial power system or at least not entirely connected. And engine-generator sets are used as primary sources of power on an ongoing, rather than emergency or temporary, basis.

Engine-generator sets are disclosed in the patent literature and U.S. Pat. Nos. 1,868,130 (Bauer et al.), 2,251,722 (Thomas), 3,025,408 (Wolf), 4,677,940 (Bracht et al.) and 5,546,901 (Acker et al.) are examples. All of the arrangements except that of the Wolf patent (which uses a step-up gearset to drive a generator from an idling auto engine) are direct drive. And that of the Thomas patent uses a flexible coupling between the engine and generator.

To provide 60 Hz AC power, a four-pole generator must be driven at 1800 rpm. It has been common practice to directly couple the driving engine to the generator (by mounting the engine and generator so their shafts are concentric) and operate the engine at 1800 rpm. Of course, the available shaft horsepower at the engine must be at least equal to the maximum input shaft horsepower required by the generator.

With the relatively-recent advent of higher speed engines, it has become possible to operate the engine at a speed higher than 1800 rpm, thereby obtaining the required horsepower using higher engine speed rather than larger engine displacement. But the requirement for a generator operating speed of 1800 rpm, dictated by the number of generator poles, remains unchanged.

Prior to the advent of the invention, this speed disparity has commonly been addressed by obtaining a separately-purchased gear box, sometimes known as a speed reducer, coupling its input shaft to the output shaft of the engine and coupling its output shaft to the generator shaft. As an example, a 2400 rpm engine driving an 1800 rpm generator dictates a step-down gear ratio of 0.75. That is, the speed of the gear box output shaft to the generator is 0.75 of the speed of the gear box input shaft.

While this arrangement has been generally satisfactory for the purpose, it is not without disadvantages. For example, the "package" of engine, gear box and generator has a size, cost and weight that, in view of the invention, are unnecessary. A comparison is set out in the detailed description for a specific engine and generator.

Another disadvantage of the above-described arrangement relates to the way the engine, gear box and generator are coupled to one another. The manufacturer must use a shaft coupling to join the engine and gear box input shaft and another shaft coupling to join the gear box output shaft and the generator shaft. This necessarily requires precious (and costly) assembly time and also requires procurement and stocking of all of the component parts.

And these are not the only factors that have been improved upon by the invention. The former arrangements of engine, gear box and generator exhibited response times in accepting load that, when compared to response times characteristic of the invention, are unnecessarily slow.

An improved engine-generator set which addresses shortcomings of the prior art would be an important technological advance.

OBJECTS OF THE INVENTION

It is an object of the invention to provide a new engine-generator set overcoming some of the problems and shortcomings of the prior art.

Another object of the invention is to provide an engine generator set which exhibits improved response time in accepting load.

Another object of the invention is to provide an engine generator set, the overall length (or height, depending upon orientation) of which is reduced.

Yet another object of the invention is to provide an engine generator set, the overall weight of which is reduced.

Another object of the invention is to provide an engine generator set which reduces costs including procurement, stocking and assembly costs.

How these and other objects are accomplished will become apparent from the following descriptions and from the drawings.

SUMMARY OF THE INVENTION

The invention involves an apparatus for providing electrical power. Such apparatus has an engine powering a generator and the generator includes a first shaft driving a generator armature. In the improvement, the generator includes a second shaft in spaced relationship to the first shaft and the second shaft is coupled to the engine.

A first gear is mounted on the first shaft and such gear has a first pitch diameter. Similarly, a second gear is mounted on the second shaft, engages the first gear and has a second pitch diameter less than the first pitch diameter. The first shaft driving the generator armature is thereby rotated at a speed less than the rotational speed of the engine.

More specifically, the generator has a housing and the first shaft is supported by a bearing (sometimes referred to as a "first-shaft bearing") mounted in the housing. The first shaft has a cantilever shaft end extending beyond the bearing. The shaft end is of the cantilever type in that such end is supported at only one side of the first gear, the latter being mounted on the cantilever shaft end. The second shaft, which is parallel to the first shaft, is supported by a pair of spaced shaft bearings (sometimes referred to as "second-shaft bearings") mounted in the housing.

The engine has a flywheel and to transmit power from the engine to the generator, the second shaft (which is concentric to and spaced from the engine flywheel) is coupled indirectly to such flywheel by a torsional coupling. As further described below, such coupling has driving and driven members with resilient devices therebetween.

More specifically, the second shaft is indirectly coupled to the engine by a driving member attached by bolts at the flywheel perimeter. A driven member is attached to the second shaft and for vibration-damping purposes, there is at least one resilient device interposed between the driving member and the driven member.

In a specific, exemplary arrangement, the driving member has a number of radially-inwardly extending fingers and the driven member has an equal number of radially-outwardly extending fingers, each of which is between and spaced from two adjacent fingers of the driving member. Resilient devices embodied as barrel-shaped resilient plugs are lodged between respective fingers of the driving and driven members so that engine vibration is substantially isolated from the generator. And torque and horsepower transmitted from the engine to the generator are transmitted solely through the resilient plugs. (The aforedescribed torsional coupling, per se, is known but it is used in a new arrangement in the inventive engine-generator set.)

Viewed another way, the second shaft (which is concentric with but spaced from the engine crankshaft) and, particularly, the second gear on such shaft do not engage the flywheel or any teeth on such flywheel. In a highly preferred embodiment, there are no teeth on the flywheel. Its circumferential edge is smooth and tooth-free.

In another aspect of the invention, the first gear is "affixed" to the generator shaft. That is, such first gear is keyed and fitted to the tapered cantilever shaft end and retained in place by a retaining member. Thus, such gear is incapable of axial or rotational movement independently of the generator shaft.

Similarly, the second gear (which is in continuous driving engagement with the first gear) is affixed to the second shaft by a key. The second gear is likewise incapable of axial or rotational movement independently of the second shaft. (It is to be appreciated that there are other ways to affix gears and shafts to one another so that no relative gear/shaft movement is permitted. The above-described arrangements are merely exemplary.)

Further details regarding the new engine-generator set are set forth in the following detailed description and in the drawings.

DETAILED DESCRIPTIONS OF PREFERRED EMBODIMENTS

This specification first provides a brief overview description of the engine-generator apparatus 10 and how the engine 11 drives the generator 13. Such brief description is followed by more detailed descriptions of the generator 13, the gear and "power train" arrangement and the engine 11, in that order.

Figure 1:
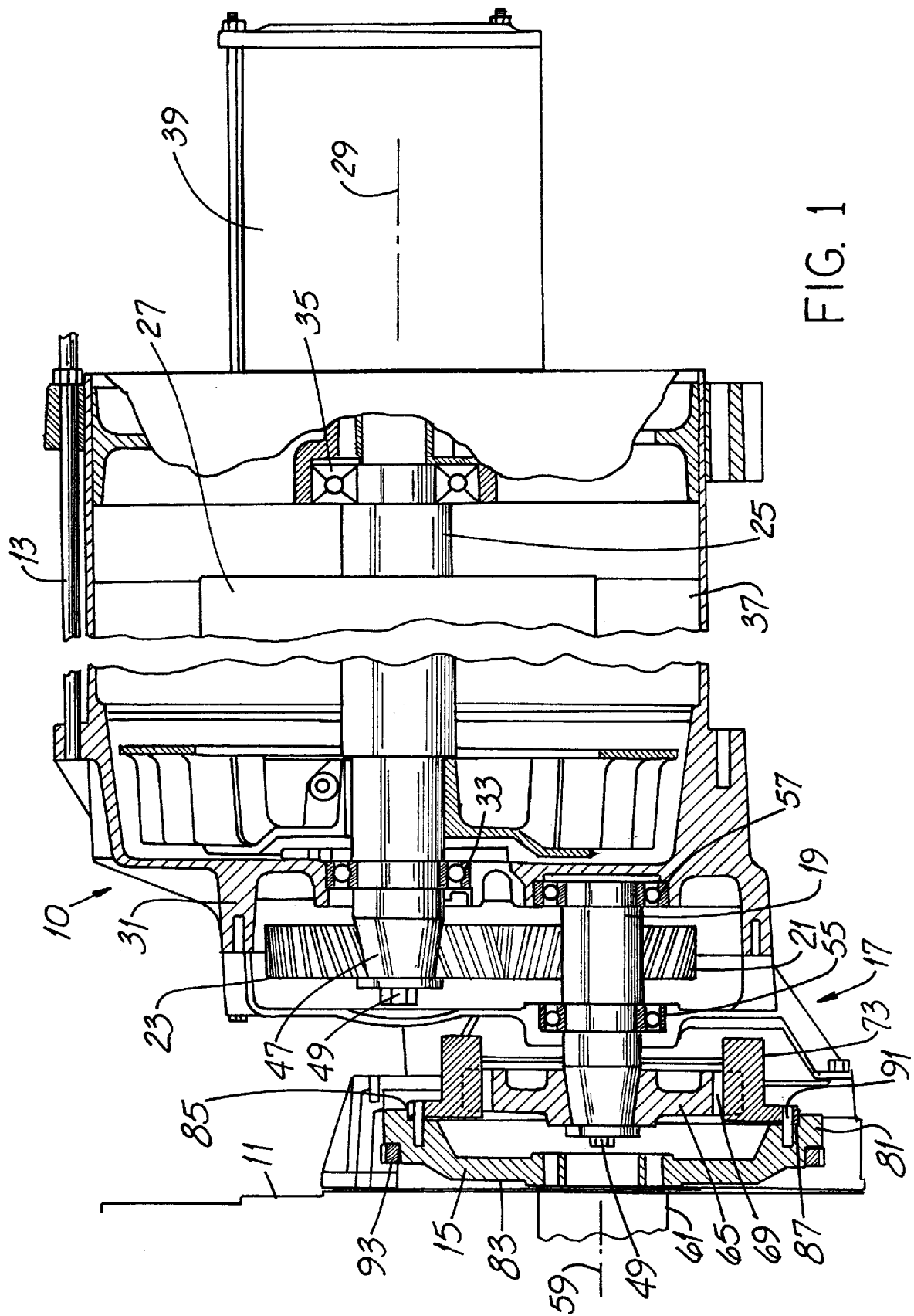
FIG. 1 is an elevation view, partly in cross-section, showing aspects of the new engine-generator apparatus. Parts are shown in full representation and parts are broken away.
Figure 2:
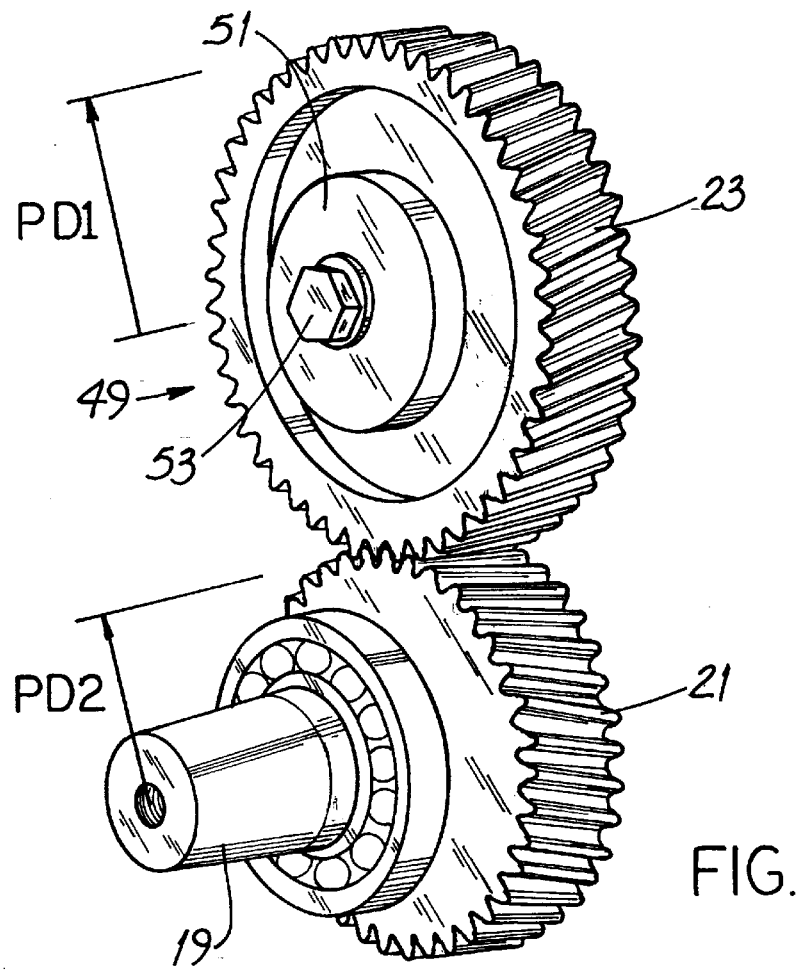
FIG. 2 is a perspective view of gears and a shaft used in the apparatus of FIG. 1.
Figure 3:
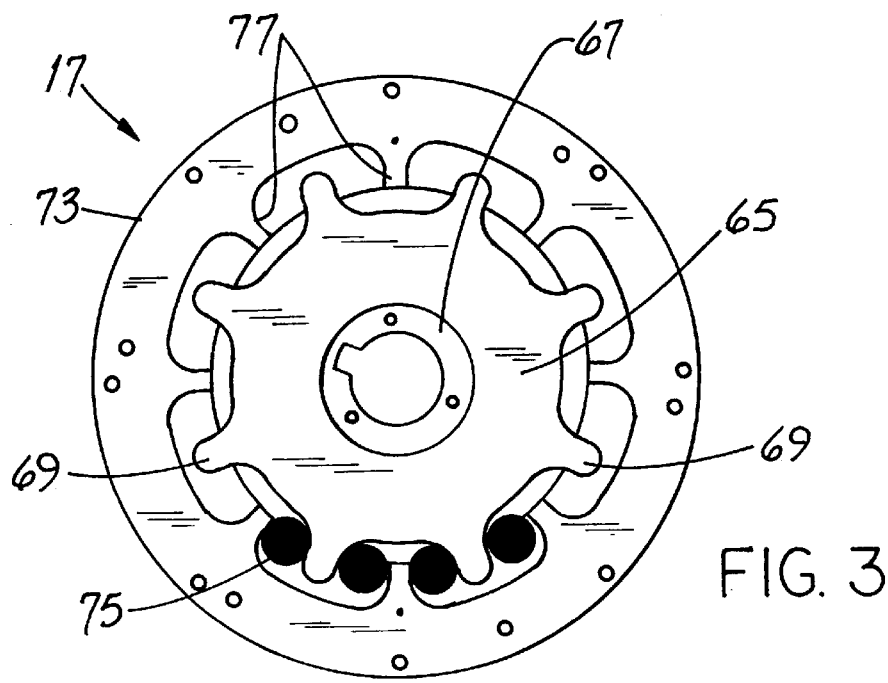
FIG. 3 is an elevation view of a torsional coupling used in the apparatus of FIG. 1.

Referring to FIGS. 1, 2 and 3, the new apparatus 10 includes an engine 11 closely-coupled to and providing driving power for a generator 13. The engine flywheel 15 transmits driving rotational horsepower through a torsional coupling 17 to a shaft 19 on which the gear 21 is mounted. The gear 21 is meshed with the gear 23 on the generator shaft 25 and such shaft 25 is concentric with and drives the generator armature 27 for generating electrical power. The gear 21 is smaller in diameter than the gear 23 and the gear pitch diameters PD1 and PD2 are selected so that the generator shaft 25 and armature 27 are driven at 1800 rpm even though the rotational speed of the engine flywheel 15, the shaft 19 and the gear 21 is higher than 1800 rpm.

While FIG. 1 shows an arrangement where the engine 11 and generator 13 are on a horizontal axis 29, the engine 11 and generator 13 may be on a vertical axis or on an axis angled to the horizontal and vertical. That is, there is no limitation on the orientation of the new engine-generator apparatus 10. And in keeping with good engineering practice, the engine 11 and generator 13 are separately supported as required to prevent overhanging loading.

Referring particularly to FIGS. 1 and 2, within the generator housing 31 is the first shaft 25 supported for rotation on a pair of spaced first-shaft bearings 33, 35. The armature 27 is mounted on the shaft 25 and when rotated with respect to the generator stator 37, provides electrical power. An exciter 39 is coupled to one end of the generator.

Outboard of the bearing 33 (leftward of the bearing 33 in the view of FIG. 1) is a tapered cantilever shaft end 47 to which is affixed the gear 23. A key (and to a certain extent friction between the gear 23 and the shaft end 47) prevent the gear 23 from rotating with respect to the shaft 25. A retaining member 49 comprising a disc 51 and retaining bolt 53 secure the gear 23 snugly on the shaft 25 and prevent axial movement of such gear 23 with respect to such shaft 25. (It should be apparent from the foregoing that the main generator shaft 25 is also incapable of axial movement.)

The shaft end 47 and first gear 23 are confined in the forward portion of the housing 31 which also contains a second generator shaft 19 mounted on a pair of second-shaft bearings 55, 57. Such shaft 19 is parallel to and spaced from the first shaft 25 is concentric with the axis of rotation 59 of the engine crankshaft 61 and the flywheel 15.

Mounted on the second shaft 19 between the bearings 55, 57 is the second gear 21 which is meshed with the first gear 23. By means further described below, this second gear 21 transmits motive power from the engine 11 to the first gear 23 and thence to the shaft 25 to turn the armature 27 and generate electrical power.

Referring to FIGS. 1 and 2, the gears 21 and 23 comprise a "step-down" gear reduction in that the first gear 23 has a pitch diameter PD1 which is greater than the pitch diameter PD2 of the second gear 21. Thus, for each 360° of rotation of the second gear 21, the first gear 23 exhibits less than 360° of rotation. The pitch diameters PD1, PD2 are selected in view of the desired generator speed (assumed to be 1800 rpm in a specific embodiment) and in view of the engine operating speed (EOS). The relevant equation is:

$$PD2 \div PD1 = 1800 \div EOS.$$

Referring particularly to FIGS. 1 and 3, the second shaft 19 protrudes through the forward portion of the housing 31 and the driven member 65 of a torsional coupling 17 is mounted to the end of such shaft 19. Specifically, the hub 67 of such member 65 is key-mounted to such shaft 19 and is secured there by a retaining member 49 like the member 49 described above. The driven member 65 includes a number of fingers 69 extending radially outwardly from the hub 67 and as described below, such fingers 69 coact with the driving member 73 and with the resilient devices 75 to transmit horsepower.

The torsional coupling 17 also has a ring-like driving member 73 having a number of fingers 77 extending radially inwardly. Resilient devices 75 embodied as barrel-shaped resilient plugs are lodged between each finger 69 of the driven member 65 and each adjacent pair of fingers 77 of the driving member 73. Upon engine startup and when the driving member 73 is rotating at operating speed, engine-originating "torque shock" and vibration are substantially isolated from the generator 13 by the coupling 17.

Referring particularly to FIG. 1, the engine 11 includes a flywheel 15 which, in the specific illustrated embodiment, is "dished" or concave when viewed from the generator side. That is, the flywheel outer perimeter 81 is closer to the generator 13 than is the flywheel central portion 83. The resulting cavity-like region accommodates the protruding end of the second shaft 19.

The outer perimeter 81 of the flywheel 15 has a locating pocket 85 receiving the driving member 73 of the torsional coupling 17. Such pocket 85 has a face 87 which abuts such driving member 73, the latter being attached to the flywheel outer perimeter 81 by fasteners 91 such as bolts. It is to be noted from FIG. 1 that the flywheel-mounted ring gear 93 engaged by the engine starter (not shown) is spaced from the driving member 73, the pocket 85 and the pocket face 87. In other words, the ability of the engine 11 to transmit power to the generator 13 involves a "drive train" that is independent of the engine starting components such as the ring gear 93.

In operation, it is assumed that electrical power is required from the generator 13. The engine 11 is started, the flywheel 15 rotates and powers the driving member 73 and, thence, powers the driven member 65 through the resilient devices 75. The driven member 65 powers the shaft 19 and the gear 21 which, in turn, powers the gear 23 by virtue of being engaged therewith. The gear 23 powers the generator shaft 25 and electrical power is produced.

To illustrate some of the advantages of the invention, a specific embodiment of the new engine-generator apparatus is 10 to 12 inches shorter in length and weighs about 30% less than a similarly-rated engine-generator set using a separate gear box.

While the principles of the invention have been shown and described in connection with a few preferred embodiments, it is to be understood clearly that such embodiments are by way of example and are not limiting.

What is claimed:

1. In a stationary-mounted apparatus including an engine powering a generator, and wherein the generator includes a first shaft supported by a pair of bearings and concentric with and driving a generator armature, the improvement wherein:

the first shaft has a shaft end extending away from the bearings;

a first gear is concentrically mounted on the shaft end and has a first pitch diameter;

the generator includes a second shaft in spaced relationship to the first shaft;

the second shaft is concentric with and coupled to the engine crankshaft and has a second gear mounted thereon in engagement with the first gear; and the second gear has a pitch diameter less than the pitch diameter of the first gear.

2. The apparatus of claim 1 wherein:

the generator has a housing;

the pair of bearings supporting the first shaft are in the housing.

3. The apparatus of claim 1 wherein:

the generator has a housing; and the second shaft is supported by a pair of spaced shaft bearings mounted in the housing.

4. The apparatus of claim 1 wherein:

the engine has a flywheel; and the second shaft is coupled to the engine flywheel by a driving member attached to the flywheel.

5. The apparatus of claim 4 wherein the flywheel is concave and includes a central portion and an outer perimeter extending away from the central portion, and wherein the second shaft protrudes into the flywheel.

6. In an apparatus including an engine powering a generator, and wherein the generator includes a first shaft driving a generator armature, the improvement wherein:

the first shaft is supported by inward and outward spaced-apart bearings mounted in the generator;

the first shaft has a cantilever shaft end protruding outwardly away from the outward bearing and toward the engine;

the cantilever shaft end has a first gear affixed thereto;

the apparatus includes a second shaft in spaced relationship to the first shaft;

the second shaft has a second gear affixed thereto, such second gear being in driving engagement with the first gear; and the engine has a crankshaft and the second shaft is coupled to the engine in axial alignment with the crankshaft.

7. The apparatus of claim 6 wherein:

the generator has a housing;

the second shaft is supported for rotation by a pair of spaced-apart bearings; and the bearings supporting the first shaft and the bearings supporting the second shaft are in the generator housing.

8. The apparatus of claim 7 wherein:

the engine includes a flywheel having a locating pocket formed therein; and the second shaft is coupled to the flywheel through a torsional coupling having a driving member received in the locating pocket.

9. The apparatus of claim 8 wherein:

the flywheel has a ring gear mounted thereon for engine starting; and the ring gear is spaced from the driving member.

10. The apparatus of claim 9 wherein:

the first gear has a first pitch diameter; and the second gear has a second pitch diameter less than the first pitch diameter, thereby driving the first shaft at a rotational speed less than the rotational speed of the engine.

* * * * *